United States Patent [19]

Gladfelter et al.

[11] Patent Number: 4,923,712
[45] Date of Patent: May 8, 1990

[54] ASPHALTIC FLASHING STICK

[75] Inventors: Jason Gladfelter, Montclair; William J. Woodring; Louis L. Grube, both of Bound Brook; Charles J. Horner, Jr., Piscataway, all of N.J.

[73] Assignee: GAF Building Materials Corporation, Wayne, N.J.

[21] Appl. No.: 178,697

[22] Filed: Apr. 7, 1988

[51] Int. Cl.⁵ .............................................. B32B 35/00
[52] U.S. Cl. ..................................... 427/140; 427/223
[58] Field of Search ................ 427/223, 140; 264/239, 264/313, 297.8; 524/69, 112, 209, 287, 296, 70, 71, 59

[56] References Cited

U.S. PATENT DOCUMENTS

| | | | |
|---|---|---|---|
| 222,696 | 12/1879 | Grossman | 427/223 |
| 1,742,346 | 1/1930 | Borsai-Fischer | 427/223 |
| 3,906,068 | 9/1975 | Hanusa | 264/313 |
| 3,915,914 | 10/1975 | Binder et al. | 428/489 |
| 4,026,854 | 5/1977 | Buechner et al. | 529/209 |
| 4,069,182 | 1/1978 | McDonald | 427/140 |
| 4,268,428 | 5/1981 | Green | 427/140 |
| 4,611,978 | 9/1986 | Sangiorgi | 264/313 |

Primary Examiner—Janyce Bell
Attorney, Agent, or Firm—Jules E. Goldberg; Marilyn J. Maue; Joshua J. Ward

[57] ABSTRACT

A device for the spot application of molten asphaltic composition to spot locations comprising a rod of solid, modified bitumen adapted for heating and end thereof. The softened or molten composition at the end can easily and conveniently be delivered to spot locations.

5 Claims, 1 Drawing Sheet

Flashing Stick

Flashing Stick

ASPHALTIC FLASHING STICK

BACKGROUND OF THE INVENTION

1. Field of the Invention

The present invention relates to a means and method for sealing roofs, walls, driveway cracks and areas where water-proofing is needed. More particularly, the present invention relates to an asphaltic composition in a form which facilitates spot application of bituminous adhesive to roof flashing around perimeters, protrusions and roof membrane laps; side wall cracks, driveway cracks and numerous other applications where asphalt might be used for caulking or water-proofing.

2. Description of the Prior Art

In the covering of roofs of buildings, a sheetlike roof-covering material is normally used. Numerous types of such sheets are known (see, for example, U.S. Pat. Nos. 4,617,221, 4,565,724, and 4,374,687).

Generally such a roofing material contains a bituminous layer which serves as an adhesive layer for securing the sheeting onto the roof. Also, it is conventional to overlap these sheets with one another in order to provide a seal. Methods for effecting such sealing are shown in U.S. Pat. No. 2,036,123.

However, because the roofing material is generally in the form of rolled sheets, it is difficult to seal off those areas of a roof which abut at sharp angles so that a tight sealing overlap can be obtained. The sheeting material itself, while flexible, is relatively rigid and does not adapt itself to contoured surfaces, particularly when the contours are defined by sharp changes of direction.

Also, numerous protrusions exist on a roof, such as, drains, vents, air-conditioning units, expansion joint covers, and the like.

Conventional methods for attempting these difficult-to-cover points of overlap or non-overlap include the use of asphaltic flashing cement. However, where roofing material containing modified bitumen is used, the roofer takes a portion of the roofing material, makes it into a roll shape, and heats the end of the roll attempting to melt whatever modified bitumen is there onto a spot location which is to be sealed. However, this method is inefficient for a number of reasons. Firstly, since the sheet is a laminate of several different materials, the bitumen or asphaltic layer makes up only a small portion of the roof sheeting and even with melting or softening the bitumen portion, one does not obtain a significant amount of melted bitumen. In addition, the rolled-up sheeting is difficult to handle and does not adapt itself easily for spot placement of molten or softened bitumen. Moreover, if it is desired merely to soften the bitumen and rub it onto a particular area, only an insufficient amount of bitumen can actually be smeared onto the area to be coated since the bitumen layer is not entirely at the surface of the sheeting.

As a result, such relatively crude attempts to spot-coat those areas which are difficult to seal with conventional roof sheeting are time consuming and inefficient. Moreover, because of the poor delivery of molten or softened bitumen to the desired area, such seals are very often incomplete. The same problems exist when it is desired to seal cracks in driveways., walls and the like, where the area is relatively small or difficult to reach.

SUMMARY OF THE INVENTION

We have discovered a device and method for its use which provides a highly facile and efficient means for sealing those difficult-to-reach or -coat areas of a roof or other surfaces, e.g., a driveway, wall, etc. More particularly, the present invention comprises a device which can be used for the spot application of molten asphaltic composition to such surfaces which is composed of solid, modified bitumen in the shape of an elongated rod. The rod may have an approximately square, triangular or cylindrical cross section and is sufficiently small to be held in the hand. The end of the rod can then be heated to melt or soften the bitumen at the very end and deliver the molten or softened bitumen to the selected spot location.

As a result of the present invention, it becomes very easy for the worker to seal those joints and severely contoured areas merely by melting the bitumen at the end of the rod and applying it to a very selective area desired to be coated and sealed.

DESCRIPTION OF THE PREFERRED EMBODIMENTS

The asphaltic rod of the present invention is generally composed of asphalt modified by polymer additives, such as, polyolefins or styrene-butadiene, butyl rubber; styrene-ethylene-butylene-styrene block polymer (SEBS), styrene-butadiene polymer (SBR), or styrene-butadiene-styrene block copolymer. The rod can be produced by either molding or extrusion.

Typical compositions for flashing rods in accordance with the present invention include the following:

Composition No. 1 approx. 0–8% Isotactic polypropylene
0–20% Atactic polypropylene
0–20% Ethylene propylene copolymer
0–20% Filler
remainder Asphalt Composition No. 2 approx. 3–20% Styrene butadiene block polymer (SBS)
0–60% Filler
remainder Asphalt Particularly preferred is the following composition which exhibits improved weatherability:

Composition No. 3 approx. 3–20% Styrene-ethylene-butylene-styrene block
copolymer (SEBS)
approx. 0–60% Filler
remainder Asphalt (All percents are by weight based on the weight of the total composition)

Preferably, the asphalt used meets the requirements specified for A.S.T.M. standard AC-5. Typically, asphalts, e.g., Indiana Farm Bureau AC-5 asphalts having a softening point (S.P.) from about 80° to 180° F. and a penetration at 25° C. of from 60 to 200 dmm are suitable. The S.P. is determined by A.S.T.M. D36 and the penetration by A.S.T.M. D5. The asphalts can have a viscosity of from 1,200 to 2,000 cps at 210° F. as determined by A.S.T.M. D4402.

The preferable filler used is limestone. However, other conventional fillers, e.g., stone dust, sawdust, mica, talc, pearlite, vermiculite, clay and the like may be used.

In addition, the composition may contain additives, such as, antioxidants, e.g., high molecular weight hindered phenolics (an example is the product Irganox 1010 produced by Ciba-Geigy); ultra-violet stabilizers, e.g., hindered amine light stabilizers (Spinuvex A-36 produced by Borg-Warner Chemicals, Inc.); carbon black, and zinc oxide; and ultraviolet screens, e.g., titanium dioxide.

The composition is molded into an elongated rod having the desired cross-sectional shape, e.g., square, rectangular, triangular or circular, of a size which can be easily handled by a roofer or other operator.

Figure 1A:
FIGS. 1 (a) and 1 (b) show flashing sticks in accordance with the present invention.
Figure 1B:
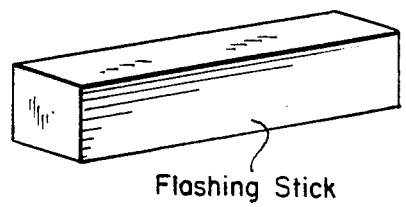
Figure 2:
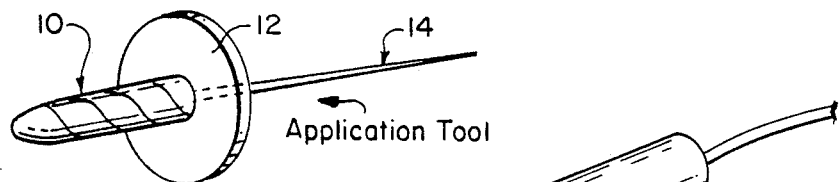
FIG. 2 shows a holder in accordance with the present invention.
Figure 3A:
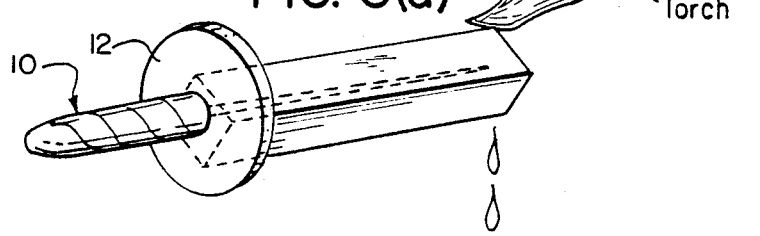
FIGS. 3(a) and 3(b) depict the method for applying bitumen to a roof utilizing the device and holders in accordance with of the present invention.

In addition, a variety of different types of holding devices may be used for holding the rod while it is being heated. FIG. 2 shows an appropriate application or holding device composed of a handle "10", a protector shield "12", and an elongated pin "14". As shown in FIG. 3(a), the pin is inserted longitudinally through the flashing rod so as to engage it on the pin "14".

Figure 3B:
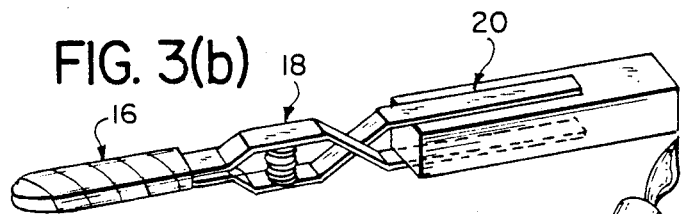

An alternative type holder is shown in FIG. 3(b) which comprises a handle "16" and a spring-clamp tong "18" which has tong portions "20" which engage the rod to hold it firmly in place. In addition, a so-called "hot-melt" gun can be used, e.g., Model No. 240, manufactured by Hardman, Inc.

In use, as shown in FIGS. 3(a) and 3(b), the roofer or operator merely holds the handle of the application tool while heating, as with the torch, the exposed end of the flashing. This end of the rod is held close to that area of the roof which it is intended to seal or coat. The molten bitumen may then be allowed to drip directly onto the area to be coated. Alternately, the bitumen can be merely softened and smeared onto the desired spot location.

The rod of the present invention can be formed by extrusion. However, a particularly advantageous method for producing the inventive rod is to prepare the composition and melt it, usually at temperatures of about 340° to 390° F. The molten material is then poured into the molds and cooled. The inventors have discovered a very desirable method wherein the molds are made of a disposable material, such as, cardboard and the like. The interior surface of the mold, i.e., that surface which contacts the molten material, is treated or coated in a manner so as to impart release properties to it. Such treatments and/or release coatings are well known and conventional in the art.

Such cardboard molds are relatively inexpensive and disposable. As a result, the mold can serve a two-fold purpose, namely, as a means for preparing the rods and as a packaging or protective cover for the rod during storage prior to use. Also, the use of such a disposable mold allows a large number of rods to be manufactured at a single time and, upon cooling, the rods in the cardboard covering can be separated into any given number and sold as a unit. Thus, it may be most desirable for the purchaser to buy the rods in units of 3, 4 or 5 at a time. The cardboard covering (mold) can be designed such that each individual rod is easily separated while in the cardboard from the next adjacent mold, as by having perforations in the cardboard.

Figure 4:
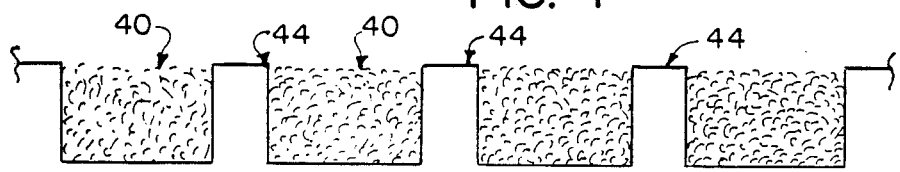
FIGS. 4 and 5 depict cross-section embodiments of molds for preparing the rod of the invention.
Figure 5:
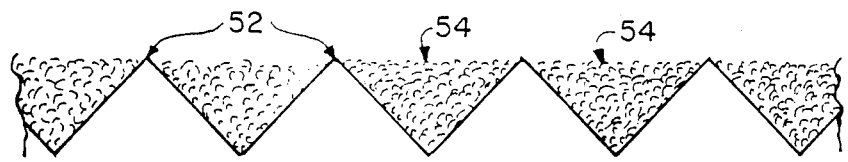

Typical molds are depicted in FIGS. 4 and 5. The mold in FIG. 4 allows for the preparation of rectangular or square shaped rods. Thus, the bituminous melt is poured into the chamber 40 of the cardboard mold. The chambers 42 are rectangular or square, being separated by partition sections depicted as 44. Moreover, partitions 44 may have perforations or a breakable score-line running longitudinally, i.e., parallel to the axis of the rod, so that each container section 40 may be easily separated from those adjacent to it. In FIG. 5, another embodiment of the cardboard or disposable mold is shown which produces rods having a triangular cross-section. In this case, the perforations or breakable score-lines would be along the top intersection indicated as 52. This particular embodiment has an additional advantage in that the mold itself is easily foldable, i.e., in an accordion-like fashion so that it can be stored in a minimal space. Also, because it has less score-lines, it is easier to manufacture.

In both of the embodiments shown in FIG. 4 and FIG. 5, it is possible to break the rods into units of 3, 4, 5, etc., which might be more preferable from the standpoint of sales to the end user. Individual rods can then be removed merely by breaking along the score-lines represented by numerals 44 in FIG. 4 or 52 in FIG. 5.

Since the flashing rod does have a somewhat tacky surface, it can be coated with a thin polymeric sheet, such as, a polyolefin sheeting, to keep it from sticking prior to use. Such a polyolefin film would melt during application and would present no interference with the actual application of the molten or softened bitumen Of course, if the rod is produced in the disposable mold as discussed hereinabove, the mold material, e.g., cardboard layer, can serve as the protective layer.

As a result of the present invention, it is possible with such an asphaltic flashing rod, used either in conjunction with or without an appropriate application tool, to apply molten or softened bitumen to very small, selected, spot locations on a roof or other surface so as to quickly and efficiently effect sealing and coating of difficult-to-reach and/or highly contoured areas, e.g., corners and the like, or small cracks in driveways, walls and the like. As a result, the rod of the present invention is particularly suited for use by home owners doing repairs by themselves.

What is claimed is:

1. A method for applying an asphaltic composition of modified bitumen roof flashing to spot locations comprising the steps of:
   (a) selecting a spot location for application of molten or softened bitumen; and
   (b) positioning the end of an elongated rod of solidified modified bitumen and simultaneously heating the end of the rod to melt or soften the bitumen so that the molten or softened bitumen drips or can be applied onto the selected location.

2. The method of claim 1 wherein the asphaltic composition comprises
   about 0-8% isotactic polypropylene
   about 0-20% atactic polypropylene
   about 0-20% ethylene propylene copolymer
   about 0-20% filler
   remainder asphalt.

3. The method of claim 1 wherein the asphaltic composition comprises about 3-20% styrene butadiene block polymer
about 0-60% filler
remainder asphalt.

4. The method of claim 1 wherein the asphaltic composition comprises
   3 to 20% styrene-ethylene-butylene-styrene block copolymer (SEBS)

0-60% filler
remainder asphalt.

5. The method of claim 1 wherein the asphaltic composition is an AC-5 asphalt having a softening point from about 80° to 180° F., a penetration of from about 60 to 200 dmm and a viscosity from about 1,200 to 2,000 cps at 210° F.

* * * * *